United States Patent [19]

Voigt

[11] Patent Number: 4,928,634

[45] Date of Patent: May 29, 1990

[54] HONDA BREAKAWAY

[76] Inventor: Dean J. Voigt, R.R. 1 Box 292, Zap, N. Dak. 58580

[21] Appl. No.: 284,906

[22] Filed: Dec. 15, 1988

[51] Int. Cl.⁵ ............................................. A01K 29/00
[52] U.S. Cl. ................................... 119/153; 24/129 R
[58] Field of Search ......... 119/153; 24/115 H, 124 R, 24/129 A, 129 D, 116 A

[56] References Cited

U.S. PATENT DOCUMENTS

| | | |
|---|---|---|
| 749,235 | 1/1904 | Smith ................................ 24/129 R |
| 820,715 | 5/1906 | Hamm ............................... 24/129 R |
| 1,167,610 | 1/1916 | Adams .............................. 24/129 R |
| 1,463,456 | 7/1923 | Bear .................................. 24/129 R |
| 1,466,495 | 8/1923 | Watson ............................. 24/129 R |
| 1,970,752 | 8/1934 | Hughes ............................. 24/129 R |
| 2,530,031 | 11/1950 | Rudolph . | |
| 2,592,696 | 4/1952 | Hoody . | |
| 3,094,755 | 6/1963 | Casanave ......................... 24/129 R |
| 3,716,031 | 2/1973 | Rowbury . | |
| 3,717,907 | 2/1973 | Klein ................................. 24/129 R |
| 3,857,645 | 12/1974 | Klein ................................. 24/129 R |
| 4,404,712 | 9/1983 | Northe et al. .................... 24/129 R |

*Primary Examiner*—Paul J. Hirsch
*Attorney, Agent, or Firm*—Wood, Herron & Evans

[57] ABSTRACT

A honda breakaway for attaching to a rope to form a lariat comprises an elongated unitary member of lightweight flexible material having substantially cylindrical end portions that are open and slit longitudinally. One end portion of the breakaway has a wide tapered slit for releasably receiving a distal end of the rope. The other end portion of the breakaway has a narrow slit for retaining a portion of the rope that is removed a selected length from the free end. The received end of the rope, the selected length of the rope, the retained portion of the rope and the unitary member define the honda which is used to form the lariat. After an object has been lassoed, an application of a sufficient force from a hand held end of the rope, opposite the distal end, pulls the distal end from the breakaway to disconnect the honda and the lariat and enable retrieval of the rope.

8 Claims, 1 Drawing Sheet

HONDA BREAKAWAY

FIELD OF THE INVENTION

The present invention relates to a honda breakaway release for a lariat that opens the lariat and the honda when sufficient force is applied to the rope.

BACKGROUND OF THE INVENTION

Lassoing live animals from a horse with a rope is a difficult task and requires a great deal of practice. The lasso or lariat must be formed as a large loop and accurately tossed so as to encircle the animal. If the throw is accurate, and the rope held taut it constricts around the roped animal. A lariat includes a relatively small loop, referred to as a honda, at one end of the rope. The rope passes through the honda to form a large loop which is the lariat. The conventional honda is formed by hand tying a small length of the rope into an eye.

When practicing roping with or without a live animal, the time it takes to open and release the lariat is inconvenient. If the practice object is a live animal, tension from the hand held end of the rope will first tighten the lariat, and then stop the animal when the rope has been fully extended. This jerks the animal. Animals soon learn to avoid this disagreeable jerk at the end of the rope and will often refuse to leave a chute or stop as soon as they feel the lariat around their necks. Aside from these inconveniences, hand removal of the lariat exposes the cowboy to the physical risk of being gored or stomped.

A honda breakaway can solve these problems by opening the honda, and the lariat as well, upon the application of a predetermined pull force. A honda breakaway alleviates the need to physically stop the lassoed animal, dismount and then manually remove the tightened lariat. A breakaway enables the honda and the lariat to be opened from a distance.

Rudolph U.S. Pat. No. 2,530,031 discloses a two piece honda breakaway designed to provide the desired feel and balance of a conventional lasso. To form the honda with this breakaway, two lengths of rope are required, one length that is hand held in forming the lariat and another shorter length that is used to form the honda. A rope end from each of the two lengths is telescopically extended into connectable ends of the two-piece breakaway and the shorter length rope is secured to the longer rope in some other manner to enclose the honda.

At least two disadvantages are presented by this two piece breakaway construction, i.e., the requirement that two separate lengths of rope are needed and the two-piece construction of the breakaway itself. Although one rope could be cut to provide the two sections, this practice results in undesired fraying and eventually a rope that is too short in length to be of practical use. With respect to the breakaway, the two piece honda construction is disadvantageous because either of separable pieces can be lost or misplaced, thus rendering the other piece useless.

Rowbury U.S. Pat. No. 3,716,031 discloses a two piece quick release lariat honda formed from a tongue part and an eye mounting socket part. The socket part is formed integrally from a single piece of cast, machined metal, and is therefore heavier than a conventional lasso. Similarly, Hoody U.S. Pat. No. 2,592,696 discloses a one piece noose releasing honda that is relatively bulky compared to a conventional honda lariat. Honda breakaways such as these do not adequately simulate the weight and feel of a conventional honda.

It is thus desirable to provide a breakaway honda for use in lassoing practice that enables a cowboy to open the lariat and honda without having to dismount and physically untie the rope, yet is not susceptible to disadvantages of prior two piece or bulky breakaway constructions.

SUMMARY OF THE INVENTION

To these ends, according to a preferred embodiment of the invention, a honda breakaway is formed from a unitary plastic member having two opposed tubular end portions and a connecting portion extending therebetween. Preferably, each of the end portions has a axial slit. The first tubular end is adapted to receive and hold one end of the rope. The second tubular end portion is adapted to hold a second part of the rope thereby forming the small loop referred to as a honda. The first end of the rope can slip through the first tubular end of the breakaway which opens the honda and thus the lariat. The honda and lariat can be reformed by snapping the rope back into the breakaway.

This one piece honda breakaway is light weight and can be made simply and inexpensively from a single piece of elongated plastic tube. An elongated notch is cut in the middle of the tube to provide the two opposed tubular ends leaving a center portion connecting the two ends. The center portion can be heated and the cylindrical ends twisted until the longitudinally extending slits open in opposite directions.

This lightweight elongated breakaway provides easy disconnection of the honda and the lariat without requiring a dismounting from the horse. Moreover, the lightweight elongated one piece construction provides the weight and feel of a conventional honda, thus enabling practice to simulate actual lassoing of a live animal.

Due to its relatively small size, the elongated breakaway may be easily stored in a pocket. Additionally, as opposed to at least one prior breakaway, this breakaway does not require two separate sections of rope in order to form the honda.

These and other features of the invention will be more readily appreciated in view of the following detailed description of the invention and the drawings in which:

DETAILED DESCRIPTION OF THE DRAWINGS

Figure 1:
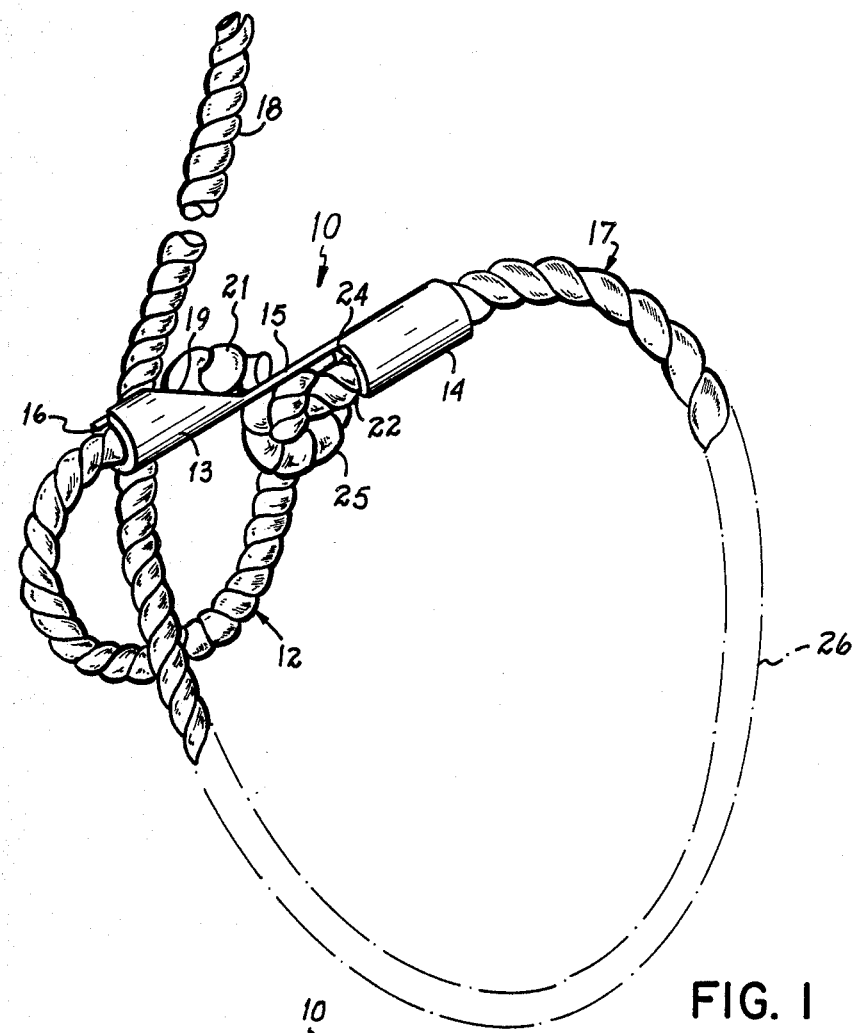
FIG. 1 is a perspective view showing a rope forming both a honda and lariat, the honda formed by a breakaway according to a preferred embodiment of the invention.
Figure 2:
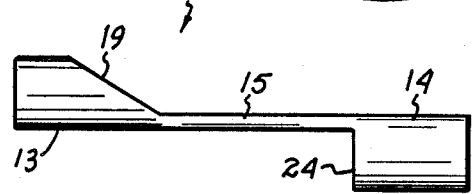
FIG. 2 is a side view of a honda breakaway according to a preferred embodiment of the invention.
Figure 3:
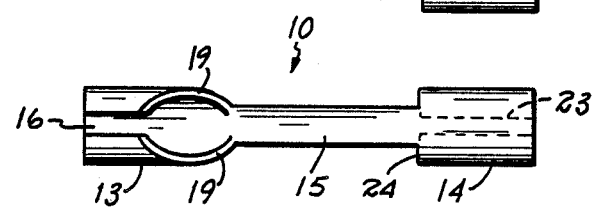
FIG. 3 is a side view of a honda breakaway according to the present invention.

FIGS. 1-3 illustrate a breakaway 10 according to a preferred embodiment of the invention which is used to form a honda 12. Breakaway 10 includes first and second cylindrical end 13, 14 connected by a central portion 15. The first cylindrical 13 end includes a central axial slit 16. End is flexible and designed to press against the rope 17, specifically end 18 as shown in FIG. 1. The slit 16 permits the end 18 of rope 17 to slide out of the cylindrical end 13 when adequate force is applied. It also permits end 18 to be snapped back into cylindrical end 13 to reform the honda 12. The inner edge 19 of first end 13 is tapered toward the central portion 15 to permit a enlarged part 21 of the rope 17 to easily slip through the first cylindrical end 13.

The second cylindrical end 14 is also adapted to receive and grasp an inner portion 22 of the rope 17. This second end 14 may include a slit 23 to permit easy placement of the breakaway 10 onto the rope 17. But this is not necessary and may be omitted.

The inner edge 24 of second end 14 is notched or stepped and opposed to tapered to keep this portion of the rope in place. Knot 25 prevents the rope from slipping through the breakaway 10.

The end portions 13 and 14 are attached by a connecting midportion 15. Preferably, the first and second end portions 13 and 14 are substantially cylindrical in shape and have longitudinally extending slits, 16 and 23 respectively, which open in opposite directions with respect to the midportion 15. Alternately the slits can open in the same direction.

The second cylindrical end portion 14 has a diameter that is relatively small in size in order to retain portion 22 and prevent relative sliding of the rope 17 with respect to the breakaway 10, even after the honda 12 and the lariat have been opened. The knot 25 also prevents relative movement. Likewise, the diameter of the first cylindrical end portion 13 is also small such that the end 18 of the rope 17 can be received therein, yet pulled therefrom under the application of a predetermined pull force.

The breakaway 10 of this invention is simple yet effective. It is preferably formed of lightweight flexible plastic material, thereby providing the same weight and feel of a conventional honda and enabling the cowboy to better simulate actual lassoing conditions during practice. Due to its relatively small size and simplicity in construction, the breakaway 10 can be mass produced rather inexpensively.

The breakaway 10 can be manufactured by injection molding. Alternately, a longitudinally extending notch can be cut in an elongated ½" PVC tube to provide the two cylindrical end portions 13 and 14 and the non-cylindrical connecting portion 15 therebetween. The longitudinally extending slits 16 and 23 are then cut through the cylindrical end portions 13 and 14, respectively. It is not critical to the invention that the slits be aligned in any particular manner, although such alignment may facilitate cutting. The elongated non-cylindrical connecting portion 15 is then heated, if necessary, to enable twisting of the cylindrical end portions 13 and 14. This twisting offsets the cylinders aligns the slits so that they open in substantially opposite radial directions.

The diameter of the cylindrical end portions 13 and 14 may be further heated and bent to decrease its diameter to a size which will better retain and hold a desired diameter of rope 17 as described earlier.

In forming the honda 12 with this breakaway 10, a knot 25 is tied in rope 17 at a selected distance from the end 18. The selected distance 26 corresponds to a desired honda circumference. A part 22 of the rope 17 that is adjacent the knot 25, but opposite end 18, is snapped into the substantially cylindrical end portion 14. The end 18 of the rope 17 is then snapped into the second substantially cylindrical end portion 13 to form a loop or honda 12. A central portion 26 of the rope 17 is extended through honda 12, thereby forming the lariat.

While I have described a preferred embodiment of a honda breakaway according to the invention, it is to be understood that the invention is not limited thereby and that in light of the present disclosure of the invention, various other alternative embodiments will be apparent to a person skilled in the art. Accordingly, it is to be understood that changes may be without departing from the scope of the invention as particularly set forth and claimed.

I claim:

1. A honda breakaway for attaching to a rope in making a lariat, comprising:
   an elongated unitary member having first and second ends, a central portion connecting said first and second ends, said first end having means to grasp a first end of a rope;
   said second end adapted to grasp and hold an end of said rope and slidably release said rope upon application of a predetermined amount of force
   wherein said second end is substantially tubular throughout its entire length and includes an axial slit completely through said second end permitting said end to flex and permit said rope to slide through said slit upon application of said predetermined amount of force.

2. The honda breakaway of claim 1 wherein said first end of said member is substantially cylindrical.

3. The honda breakaway of claim 1 wherein said second end of said member is substantially cylindrical.

4. The honda breakaway of claim 3 wherein said first end includes an axial slit formed therein.

5. The honda breakaway of claim 1 wherein said breakaway is flexible plastic.

6. The breakaway of claim 1 wherein said second end has a tapered end portion.

7. A honda breakaway for attaching to a rope in making a lariat, the breakaway comprising:
   an elongated lightweight flexible unitary plastic member having first and second substantially cylindrical end portions and a connecting portion extending along an axis therebetween, the cylindrical end portions each having a longitudinal slit extending parallel to the length of the member;
   said first cylindrical end portion adapted to releasably receive a first end of said rope to partially define a honda;
   said second cylindrical end portion adapted to retain a second portion of the rope to define a honda for forming the lariat, whereby said first end of the rope can be releasably held by said first cylindrical end portion so that under the application of a predetermined pull force from a hand held end of the rope opposite said first end after the lariat has been constricted upon a lassoed object, enables disconnection of said honda and said lariat and retrieval of the rope and breakaway from a distance substantially equal to the length of the rope.

8. A lariat having a releasable honda for opening the lariat formed from a rope, the rope having a distal end and a hand held end, comprising
   a first part of the rope retained in a first substantially cylindrical end portion of a unitary breakaway member, said part being a selected length from said distal end, said breakaway having a second substantially cylindrical end portion opposite said first end portion and a midportion between said first and second end portions;

said distal end of said rope is held within said second substantially cylindrical end portion, said inserted distal end, said breakaway, said selected length and said retained part forming the honda wherein said second end portion includes an axial slit adapted to permit said rope to slide therethrough upon application of a predetermined amount of force.

* * * * *